United States Patent
Jagannathan et al.

(10) Patent No.: US 11,941,966 B2
(45) Date of Patent: Mar. 26, 2024

(54) AUTOMATIC DETERMINATION AND NOTIFICATION OF IRRITANT RELIEF

(71) Applicant: International Business Machines Corporation, Armonk, NY (US)

(72) Inventors: Harini Jagannathan, San Jose, CA (US); Ryan Moniz, San Jose, CA (US); Alex Xingqi Casella, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/656,228

(22) Filed: Mar. 24, 2022

(65) Prior Publication Data

US 2023/0306835 A1    Sep. 28, 2023

(51) Int. Cl.
 *G08B 21/18*    (2006.01)
 *G08B 7/06*     (2006.01)
 *G06Q 30/0201*  (2023.01)
 *H04W 84/18*    (2009.01)
 *H04W 88/02*    (2009.01)

(52) U.S. Cl.
 CPC .............. *G08B 21/18* (2013.01); *G08B 7/06* (2013.01); *G06Q 30/0201* (2013.01); *H04W 84/18* (2013.01); *H04W 88/02* (2013.01)

(58) Field of Classification Search
 CPC .......... G08B 21/12; G08B 21/18; G08B 7/06; G06Q 30/0201; H04W 84/18; H04W 88/02
 See application file for complete search history.

(56) References Cited

U.S. PATENT DOCUMENTS

| | | | |
|---|---|---|---|
| 10,189,616 B2 | 1/2019 | Kraft | |
| 10,937,530 B2 | 3/2021 | Gupta | |
| 11,323,196 B1* | 5/2022 | Newton | ............... H04J 3/1682 |
| 2018/0325422 A1* | 11/2018 | Sokol | ...................... A62B 7/10 |
| 2019/0080055 A1* | 3/2019 | Bettencourt Da Silva | .................. G16H 20/30 |
| 2019/0279069 A1* | 9/2019 | Bastide | .................. G16H 20/10 |
| 2021/0185587 A1* | 6/2021 | Chelminski | ............. H04W 4/46 |

FOREIGN PATENT DOCUMENTS

EP    2353131 A1    8/2011

OTHER PUBLICATIONS

"Allergy Plus." Pollen.com, Page last modified Oct. 15, 2021, 2 pages, <https://www.pollen.com/tools/iphone>.
"Allergy Tracker Tool & App", ZYRTEC, last printed Mar. 21, 2022, 4 pages, <https://www.zyrtec.com/allergy-forecast>.
"Cold vs Allergy Symptoms", Tylenol, last printed Mar. 18, 2022, 2 pages, <https://www.tylenol.com/symptoms/cold-flu/cold-vs-allergy>.

(Continued)

*Primary Examiner* — Brian Wilson
(74) *Attorney, Agent, or Firm* — Haley J. McClory

(57) ABSTRACT

A processor may receive irritant data associated with one or more environments and a user. A processor may analyze the irritant data. A processor may identify that one or more irritants associated with the user, are located in the one or more environments. A processor may generate an irritant alert to the user. The irritant alert may indicate at least one irritant of the one or more irritants is associated with the one or more environments.

17 Claims, 5 Drawing Sheets

(56) References Cited

OTHER PUBLICATIONS

"Smart Inhaler", Published by Adherium Ltd., last printed Mar. 18, 2022, 3 pages, <https://web.archive.org/web/20200319071027/http://www.smartinhaler.com/>.
"WebMD Allergy App", WebMD, Last printed Oct. 15, 2021, 2 pages, <http://www.webmd.com/allergy-app>.
Anonymous, "Outcome and Assessment Information Set OASIS-D Guidance Manual." Published by Centers for Medicare & Medicaid Services, Effective Jan. 1, 2019, 335 pages.
Anonymous, "System and Method for RFID Usage in the Proper Administration of Medications", An IP.com Prior Art Database Technical Disclosure, IP.com No. IPCOM000169623D, IP.com Electronic Publication Date: Apr. 24, 2008, 4 pages, <https://ip.com/IPCOM/000169623>.
Anonymous, "System to Recommend More Suitable Medications and Dosages", An IP.com Prior Art Database Technical Disclosure, IP.com No. IPCOM000258970D, IP.com Electronic Publication Date: Jun. 28, 2019, 7 pages, <https://ip.com/IPCOM/000258970>.
Anonymous, "Unauthorized Use of the GPC." Unknown Publication, 2019, 32 pages.
Anonymous, "Understanding Nasal Allergies", Saint Luke's, 5 pages, <https://www.saintlukeskc.org/condition/allergies#>.
Anonymous. "Presentation of AI-, AR-, and IoT-Based Health Compatibility Score and Rationale for Smart Purchases", An IP.com Prior Art Database Technical Disclosure, IP.com No. IPCOM000266147D, IP.com Electronic Publication Date: Jun. 16, 2021, 7 pages, <https://ip.com/IPCOM/000266147>.
Borreli, Lizette, "Common Cold vs. Seasonal Allergies: How to Tell the Difference and Treat the Symptoms", Medical Daily, Mar. 20, 2015, 4 pages, <https://www.medicaldaily.com/pulse/common-cold-vs-seasonal-allergies-how-tell-difference-and-treat-symptoms-326424>.
Griffin, R. Morgan, "Allergies and Your Sinuses: Fighting Allergic Rhinitis", WebMD, Medically Reviewed on Apr. 24, 2018, 10 pages, <https://www.webmd.com/allergies/features/allergies-allergic-rhinitis#1>.
Jewell, Tim, "The Best Allergy Apps of 2020", healthline, Updated on Aug. 12, 2020, 9 pages, <https://www.healthline.com/health/allergies/top-iphone-android-apps>.
Mell, et al., "The NIST Definition of Cloud Computing", National Institute of Standards and Technology, Special Publication 800-145, Sep. 2011, 7 pages.
Tahnk, Jeana Lee, "5 Mobile Apps for Seasonal Allergy Sufferers", Mashable, Apr. 13, 2012, 3 pages, <https://mashable.com/archive/mobile-apps-seasonal-allergy-sufferers#X.8198Wuiqqo>.
Vega, Alex, "Allergic Reactions Can Cause Confusion", EzineArticles.com, Submitted on Jul. 19, 2010, 2 pages, <https://ezinearticles.com/?Allergic-Reactions-Can-Cause-Confusion&id=4697355>.

\* cited by examiner

AUTOMATIC DETERMINATION AND NOTIFICATION OF IRRITANT RELIEF

BACKGROUND

The present disclosure relates generally to the field of artificial intelligence (AI) and more particularly, to mitigating the effects of irritants on users.

People around the world habitually experience agitation from debris/irritants (e.g., allergies). These agitations can result from house dust mites, mold, animal dander/hair, and plant pollen. Symptoms of irritants, such as nasal allergies, may include nasal discharge, sneezing, and/or coughing. Such symptoms often overlap with common cold or flu symptoms. Often, a user experiencing such symptoms may misinterpret these symptoms and take the wrong medication. This may result in a delay in the user's healing process.

SUMMARY

Embodiments of the present disclosure include a method, computer program product, and system for managing an one or more devices in a smart environment. A processor may receive irritant data from one or more environments and a user. A processor may analyze the irritant data. A processor may identify that one or more irritants associated with the user, are located in the one or more environments. A processor may generate an irritant alert to the user. The irritant alert may indicate at least one irritant of the one or more irritants is associated with the one or more environments.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
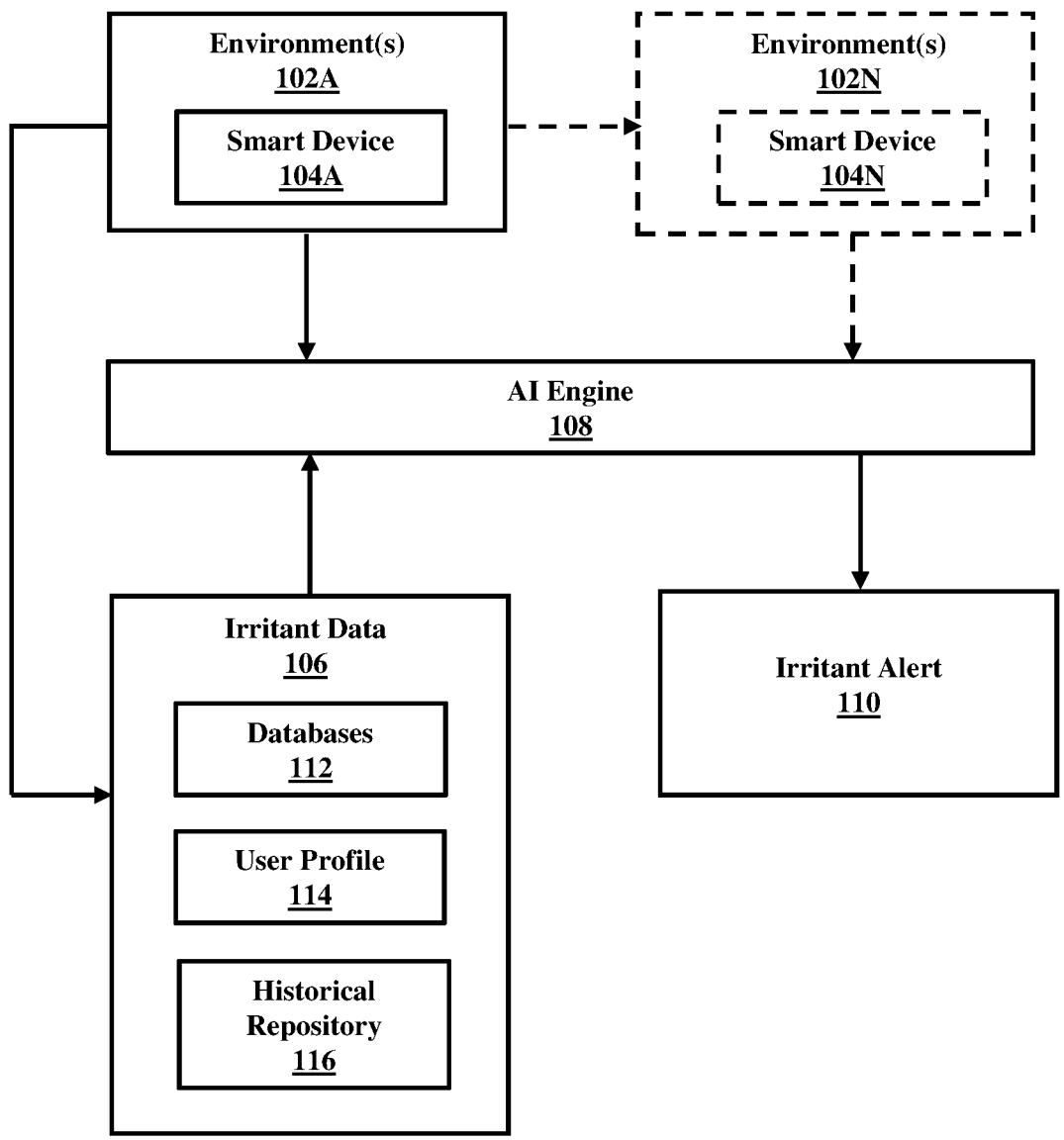
FIG. 1 depicts a block diagram of an embodiment of irritant alert system, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present disclosure relates generally to the field of artificial intelligence (AI) and more particularly, to mitigating the effect of irritants on a user. While the present disclosure is not necessarily limited to such applications, various aspects of the disclosure may be appreciated through a discussion of several examples using this context.

Many people struggle to correctly identify symptoms of nasal discharge, sneezing, and/or coughing as the result of allergies/irritants, the common cold, or flu. Such struggles are often a result of users' inability to be continuously aware of weather changes and the presence of various irritants (e.g., allergens) in environments the users intend to occupy. As such there is a desire for a solution that provides irritant alerts for users who have side effects or reactions that may be triggered by irritants in a particular environment. In an example embodiment, this solution may be implemented as an application a user may access on a smart device (e.g., smart phone) that receives irritant data from multiple sources (e.g., location data, real-time weather data, location specific pollen count, barometric pressure, etc.). Solutions provided herein may aggregate this irritant data to provide one or more recommendations (e.g., irritant suggestions) to a user that may aid the user not only in reducing potential symptoms, but also identifying whether symptoms are related to interaction with an allergen/irritant or cold/flu symptoms.

Before turning to the FIGs. it is noted that the benefits/novelties and intricacies of the proposed solution are that:

An irritant alert system configured to receive and/or collect allergen/irritant data associated with over the counter (OTC) medication, stores where the OTC medication may be found (e.g., local pharmacies) and/or where in the store the medication may be found (e.g., directions to the particular aisle the medication is stocked in).

The irritant alert system may also be configured to interact with different networks to further enable a user to receive one or more irritant alerts. For example, if two users are positioned within close proximity of each other, each user having a smart device configured to use a different cellular network (e.g., AT&T®, Verizon®, etc.) with one cellular network stronger than the other cellular network, the irritant alert system may configure the strong cellular network of one user to relay an irritant alert to the smart device of the user with the weaker cellular network.

The irritant alert system may be configured to collect and combine data points from one or smart devices and their associated sensors. These data points may include information associated with OTC irritant medications (e.g., OTC medication sales trends at local pharmaceutical stores) location data, weather data, pollen count data.

The irritant alert system may be configured to generate irritant alerts for a single user or for a user associated with a group. For example, irritant alert system may be configured on the parents of a child. In this example the irritant alert system may generate an irritant alert on one of the parent's smart devices regarding their child's allergies or reactions caused by an irritant. In some embodiments, the irritant alert system may be configured to generate an irritant alert that is sent to the user's primary care physician.

In some embodiments, the irritant alert system may analyze information, optionally provided by a user, and information contemplated herein, to establish a baseline of symptoms a user may encounter. In such embodiments, this analysis may be used to identify the severity of user symptoms more correctly and to generate one or more recommendations (e.g., different OTC irritant medication type or change in dosages) based on the severity of user symptoms. In other embodiments, the irritant alert system may issue an irritant alert associated with the OTC irritant medication. For example, if an OTC irritant medication is recalled by the company, the irritant alert system may be configured to issue an irritant alert indicating to a user that the particular recalled OTC irritant medicine is not to be used.

In addition to these aforementioned benefits, the processor may provide users with a plethora of other advantages. In some embodiments, these benefits may include reducing time and effort of the user associated with identifying possible concerns related to irritants and determining how the user should best mitigate the effects of such irritants (e.g., allergies). Because embodiments contemplated herein use a variety of information sources (e.g., irritant data), the possibility of false positive irritant alerts is significantly reduced or eliminated. In embodiments where a user has optionally provided their medical history, a processor may use allergen/irritant medication sales data (e.g., irritant data) to provide personalized irritant alerts having one or more irritant suggestions that can aid the user to buy the most helpful type and doctor recommended dosage of OTC irritant medication. In some embodiments where the user has opted in or optionally provided irritant medical information, a process or may automatically update the user's medical records to include the OTC irritant medication.

Referring now to FIG. 1, illustrated is a block diagram of an example irritant alert system 100, in accordance with aspects of the present disclosure, for generating irritant alerts to users who may be negatively impacted by one or more irritants. As depicted, irritant alert system 100 may be configured to include one or more environments 102A-N, one or more smart devices 104A-N, irritant data 106, AI engine 108, and one or more irritant alert(s) 110. One or more environments 102A-N may include any area or particular environment or specific location a user intends to interact with. For example, one or more environments 102A-N may include, but is not limited to, parks, travel routes where the user may be walking from one location to the next, a building (e.g., the user's workplace). or any other location the user may encounter one or more irritants the user may react to. While embodiments contemplated herein may refer to a single environment (e.g., environment 102A), irritant alert system 100 may include any number of environments that may be associated with the user (e.g., environment 102A).

In some embodiments, environment(s) 102A-N may include one or more smart devices 104A-N. Irritant alert system 100 may configure the one or more smart devices 104A-N to collect irritant data 106 from environments 102A-N. Smart devices 104A-N may include, but are not limited to Internet of Things (IoT) devices, sensor, mobile phones, wearable devices or any other device that may be configured to relay information (e.g., irritant data) collected from environment(s) 102A-N to irritant alert system 100. For example, irritant alert system 100 may configure a user's smart phone's built-in-sensors to identify the user's location, intended destination, weather, pollen count, and barometric pressure information. In some embodiments, irritant data associated with environment(s) 102A-N by smart device(s) 104A-N may be stored in a historical repository (e.g., historical repository 116).

In embodiments, irritant alert system 100 may be configured to collect/receive irritant data 106. Irritant alert system 100 may collect/receive irritant data 106 from a variety of sources such as, live data feeds from environment(s) 102A-N via smart device(s) 104A-N, databases 112, user profiles, 114, and/or historical repository 116. Irritant data collected from one or more smart devices 102A-N associated with a particular environment, such as environment 102A, may include, but is not limited to: i) irritant types associated with environment 102, (e.g., different pollen types, animal dander, the presence of particular animals such as bees and other insects, allergy/irritant inducing dust or mold, etc.); ii) concentration of the irritant in environment 102A (e.g., high pollen count or low pollen count); iii) barometric pressure information; iv) weather data; v) geo-location data; and/or vi) data generated as a result of any of the analyses contemplated herein (e.g., information/data identified by AI engine 108 using historical irritant data from the historical repository). In some embodiments, irritant data 106 collected from one or more smart devices 104A-N may be collected over time and stored in historical repository 116. Such irritant data may be stored in historical repository 116 may be used by AI engine 108 during the various analyses contemplated herein. In some embodiments, irritant data 106 may also be accessed from one or more databases 112. Database 112 may include a variety of information, such as information associated with different types of OTC irritant medications, information associated with different types of allergic/irritant reactions, information associated with identifying different irritants in particular environments, and/or any other information that may be used to predict or mitigate a user's potential interaction with an irritant. In some embodiments, database 112 may include trend information associated with OTC irritant medications. For example, trend information may include data associated with the fluctuations in OTC irritant medication sales based on seasonal changes associated with particular environment 102A throughout the year. If there is a sales increase of OTC irritant mediations, this may indicate an onset of allergy/irritant season.

In some embodiments, irritant alert system 100 may be configured to receive irritant data 106 in the form of a user profile 114. User profile 114 may include user information optionally uploaded and/or provided access to by the user. In some embodiments, a user may provide the user profile with user information including, but not limited to, a list of possible allergic/irritant reactions to various irritants, list of current medications, and access to allergy/irritant related medical history. In some embodiments, irritant alert system may be configured to issue notifications to a user asking the user to indicate if they have any symptoms (e.g., itchy eyes, nasal discharge, etc.). In such embodiments, irritant alert system 100 may be configured to store this information in the user's user profile 114.

As contemplated herein, some data/information associated with irritant data 106 may be stored in historical repository 116. Historical repository 116 may include data/information associated with the user (e.g., user location) and the one or more environments 102A-N that the user may occupy or interact with. In one example embodiment, a user who lives in a geographical location with varying seasons, may walk to work using the same route every day. In this example, irritant alert system 100 may collect the user's location and work travel route over time (e.g., irritant data) as well as the changes to the one or more environments 102A-N associated with the work travel route may occur during that time duration (e.g., using one or more smart devices 104A-N).

In embodiments, irritant alert system 100 may be configured to analyzing irritant data 106. In such embodiments, AI engine 108 may analyze and aggregate irritant data 106 associated with one or more users to predict if and how a user may be affected by an irritant associated with environment 102. For example, AI engine 108 may be configured to analyze the irritant data associated with user profile 114 to confirm if the user's indicated symptoms are more likely than not a result of irritants, or if the user's symptoms are associated with another ailment, such as the common cold or flu.

In some embodiments, AI engine 108 may be configured to analyze irritant data 106 associated with one or more environments 102A-N to determine if there one or more irritants that may result in the user having an allergic/irritant reaction (e.g., nasal discharge) or allergies if the person were to interact or occupy the one or more environments 102A-N. AI engine 108 may identify the type of irritant and concentration of irritant (e.g., pollen count) to determine if the one or more irritants in the one or more environments 102A-N are more likely than not to result in one or more irritants associated with the user. In some embodiments, AI engine 108 may compare the one or more irritants associated with the one or more environments 102A-N with a list of irritants the user has identified in user profile 114 that the user has identified as causing an allergic/irritant reaction. In embodiments, irritant alert system 100 may be configured to leverage current and past user location information (e.g., irritant data) to correlate with recent and past allergy/irritant weather results to better determine if the user is in an environment that has or may be expected to have irritants that may cause the user to have an allergic/irritant reaction.

In embodiments, irritant alert system 100 may use the various analyses performed by AI engine 108 to generate an irritant alert 110 to the user. In embodiments, the irritant alert 110 may indicate at least one irritant of the one or more irritants that may result in the user having an allergic/irritant reaction, is in an environment the user intents to interact with or occupy. In embodiments, irritant alert 110 may include one or more.

Irritant alert 110 may be displayed to a user on a personal smart device, such as a smart phone or smart watch. In some embodiments, irritant alert 110 may also include one or more irritant suggestions relevant to the user. In some embodiments, the one or more irritant suggestions are personalized to the user. For example, one or more irritant suggestions may include a suggested alternative travel route that will decrease the likelihood the user may encounter or interact with an irritant associated with a particular environment. In some embodiments, one or more irritant suggestions may include one or more particular OTC irritant medicine and doctor recommended dosage that may mitigate or eliminate the symptoms of the user's allergic/irritant reactions.

In some embodiments, irritant alert system 100 may be configured to send an irritant alert 110 to a primary user that is not the immediate user. For example, in a group of users, such as a family, irritant alert 110 may be issued for a child or minor. In some embodiments, a parent user (e.g., primary user) may receive the irritant alert on behalf of the child user (e.g., immediate user).

In embodiments where the user may be traveling and the user loses their mobile device loses connectivity, irritant alert system 100 may utilize a wireless mesh network or a decentralized form of networking that allows each not to relay data for the network. Using such wireless mesh networks may enable irritant alerts 110 to be passes from one user to another user. For example, in locations where there may be multiple users in an environment (e.g., airports, bus stations, train stations, etc.), irritant alert system 100 may be configured to send out an irritant alert 110 of one user (e.g., user able to wirelessly receive the irritant alert) and propagate the irritant alert 110 as it relates to another user or group of users (e.g., users who has lost connectivity). In such embodiments, irritant alert system 100 may issue the irritant alert 110 to as many users as needed. In some embodiments, stores carrying OTC irritant medications (e.g., pharmacies) may act as a relay for irritant alerts 110. For example, Irritant alert system 100 may be configured to use a wireless mesh network to send irritant alerts 110 to users who enter the store or who purchase the OTC irritant medication. In some embodiments, based on user defined settings, irritant alert system 100 may send the data/information associated with irritant alert 110 to their primary care physician.

Figure 2:
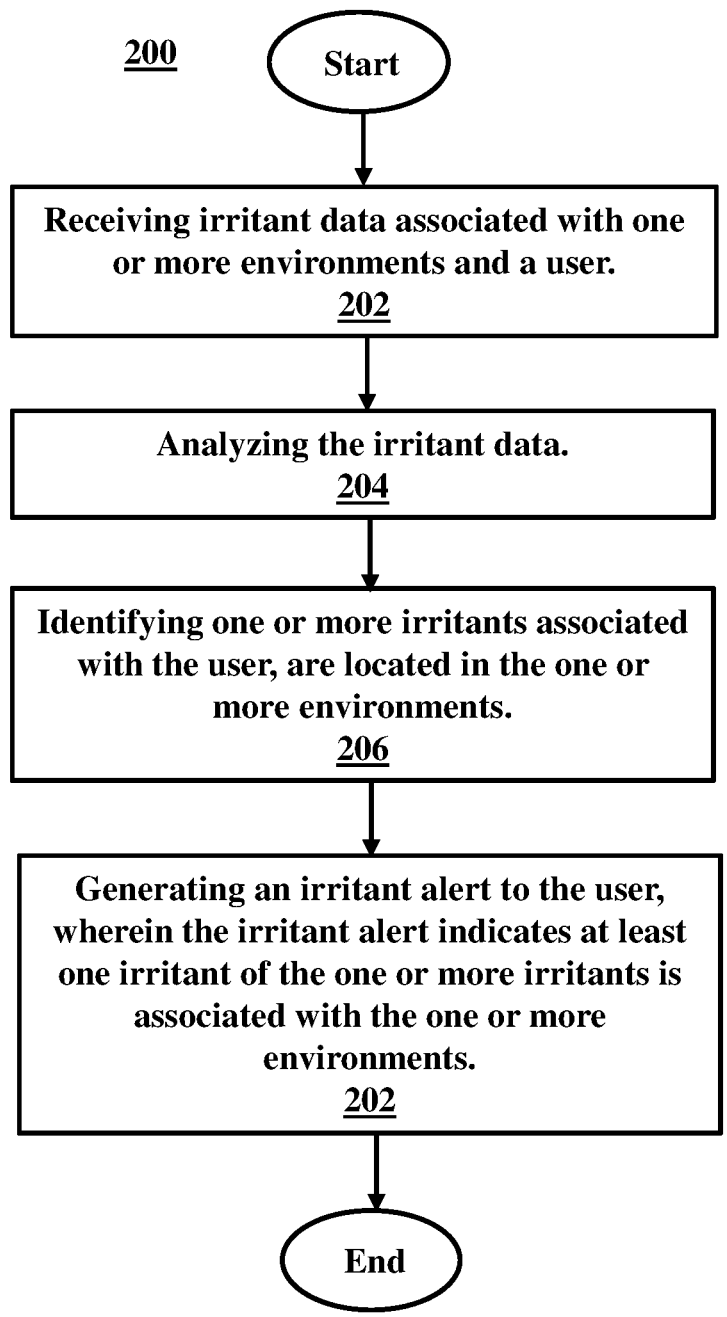
FIG. 2 illustrates a flowchart of a method for managing irritant alerts, in accordance with embodiments of the present disclosure.

Referring now to FIG. 2, illustrated a flowchart of an example method 200 for managing irritant alerts, in accordance with aspects of the present disclosure. In some embodiments, the method 200 may be performed by a processor (e.g., of the internet data management system 100 of FIG. 1, etc.).

In some embodiments, the method 200 may begin at operation 202. At operation 202 the processor receives irritant data from one or more environments and a user.

In some embodiments, the method 200 may proceed to operation 204, where the processor analyzes the irritant data (e.g., using AI engine 108).

In some embodiments, the method 200 proceeds to operation 206. At operation 206, the processor identifies one or more irritants associated with the user, are located in the one or more environments.

In some embodiments, the method 200 may proceed to operation 208. At operation 208, the processor generate an irritant alert to the user. In some embodiments, the irritant alert may indicate at least one irritant of the one or more irritants is associated with the one or more environments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
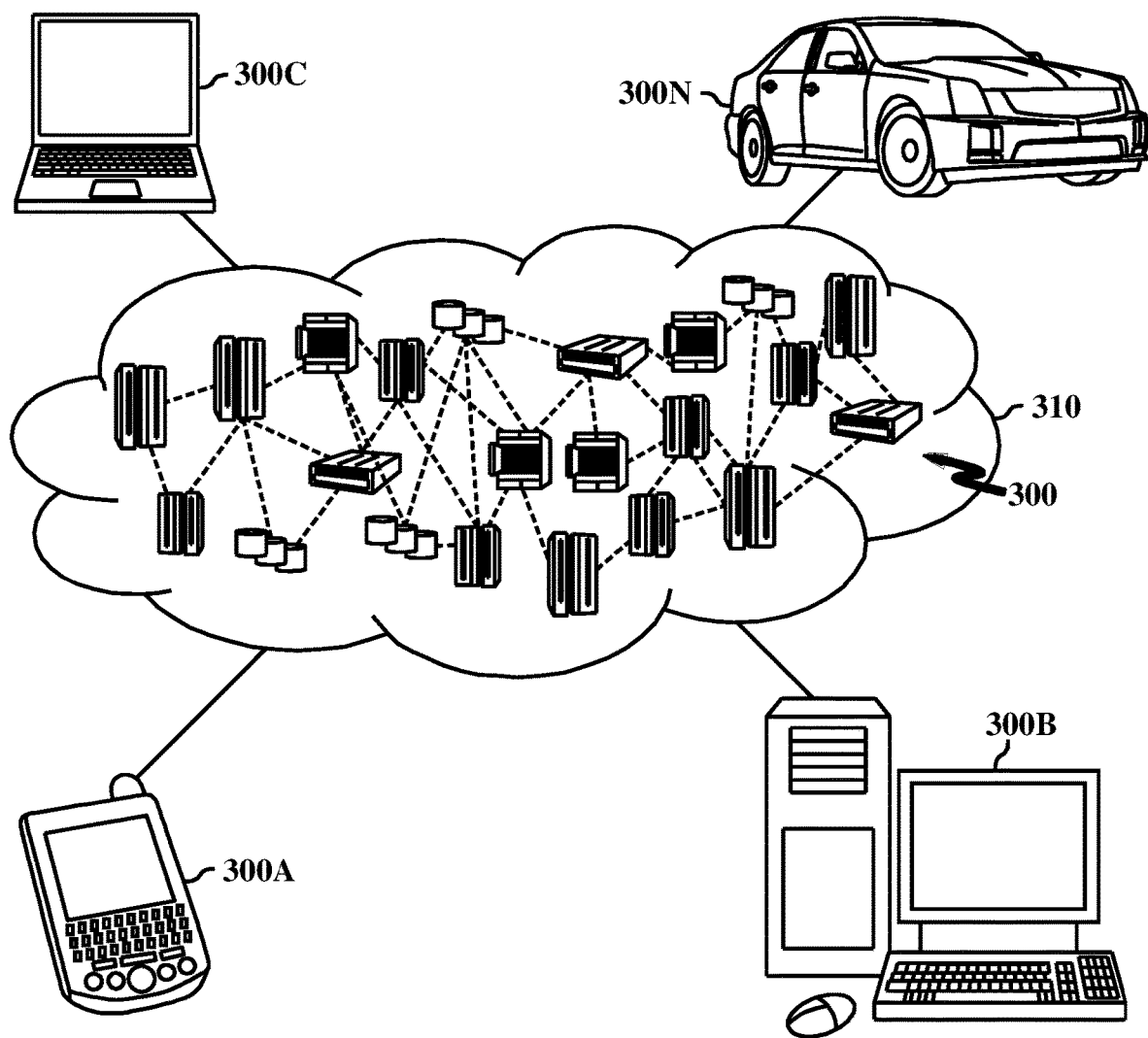
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
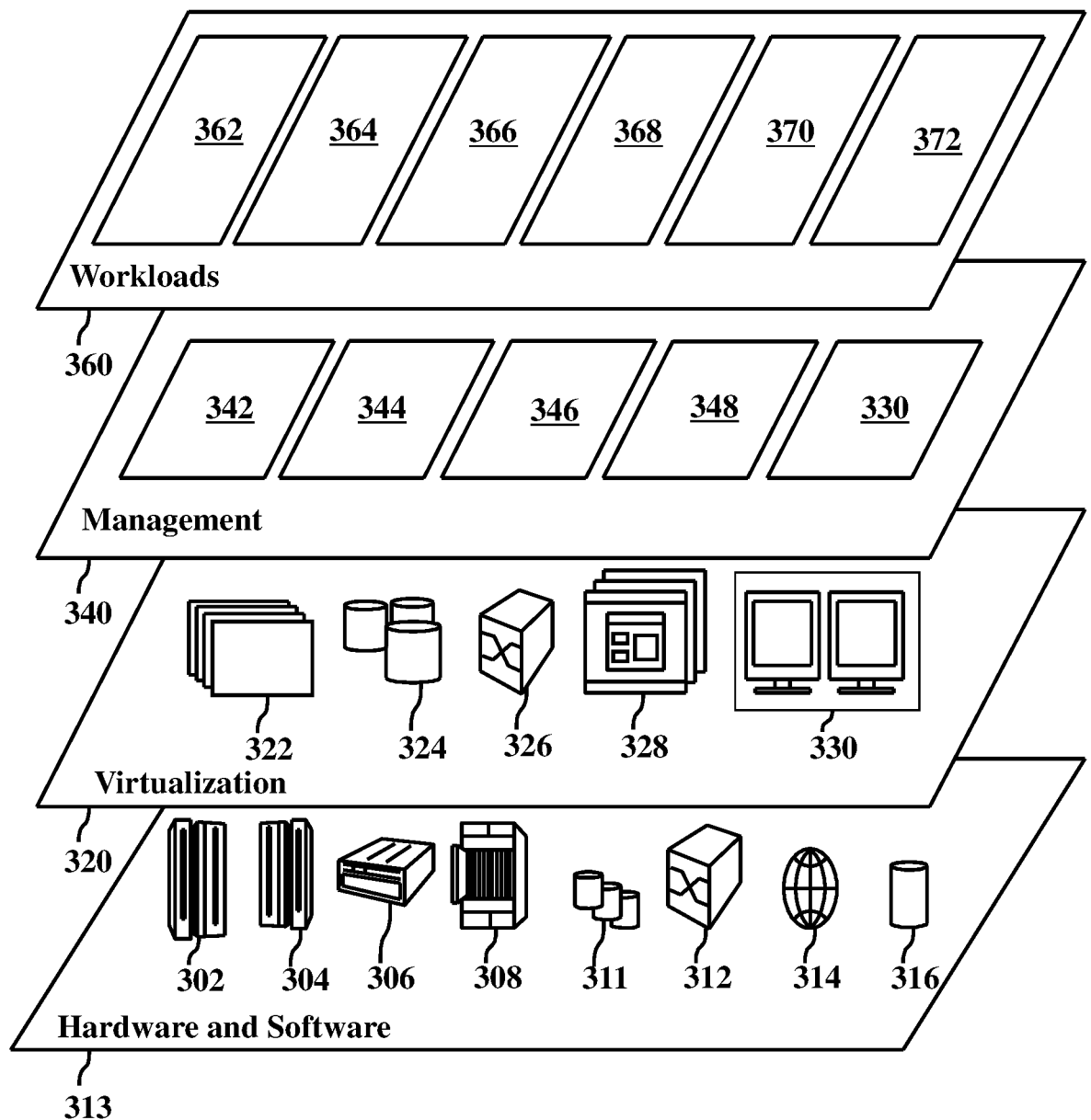
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components.

Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below.

Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and allergen/irritant detection/management 372.

Figure 4:
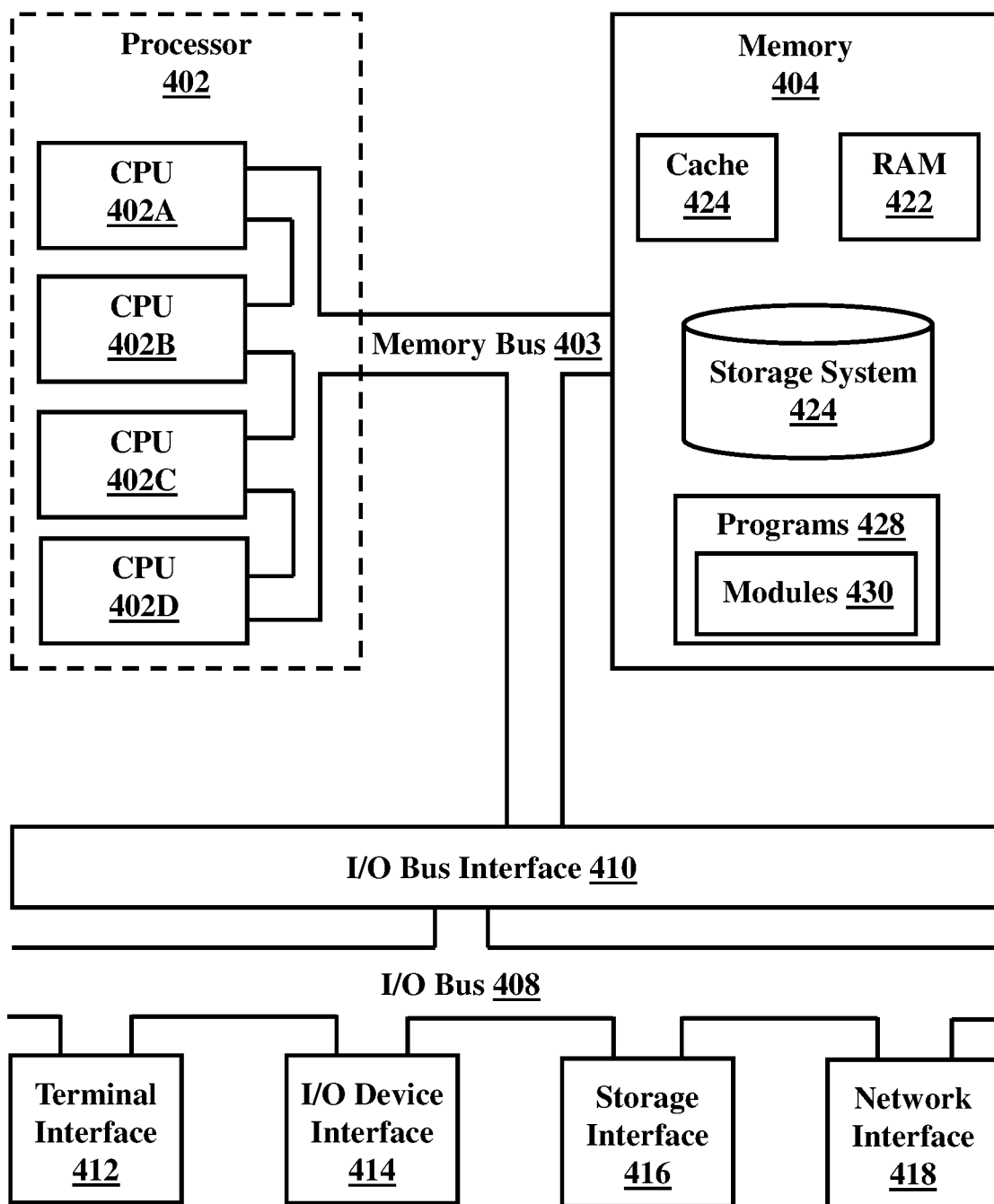
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer implemented method for generating an irritant alert, the method comprising:
   receiving, by a processor, irritant data associated with one or more environments and a user;
   analyzing the irritant data to identify one or more potential irritants in the one or more environments;
   predicting a user impact of the one or more potential irritants in the one or more environments based on one or more irritants of the user;
   determining that the one or more irritants associated with the user are located in at least one environment of the one or more environments;

generating the irritant alert to the user, wherein the irritant alert indicates at least one irritant of the one or more irritants is associated with the at least one environment prior to the user entering the at least one environment; and displaying the irritant alert to the user, wherein the irritant alert is displayed to the user when the user enters an area having pharmaceuticals associated with allergy relief.

2. The method of claim 1, further comprising:

generating trend information associated with one or more over counter (OTC) irritant medications; and identifying, from the trend information, the at least one irritant of the one or more irritants associated with the one or more environments.

3. The method of claim 1, further comprising:

pushing the irritant alert to a personal smart device associated with the user, wherein pushing the irritant alert causes the personal smart device to have a tactile response.

4. The method of claim 1, further comprising:

propagating the irritant alert to a group of users associated with the one or more environments, wherein propagating includes one or more meshed devices on a wireless mesh network.

5. The method of claim 1, further comprising:

issuing the irritant alert to a primary user, wherein irritant alert is associated with an immediate user, wherein the primary user is not the immediate user.

6. The method of claim 1, wherein the irritant alert includes one or more irritant suggestions.

7. A system for generating an irritant alert, the system comprising:

a memory; and a processor in communication with the memory, the processor being configured to perform operations comprising:

receiving irritant data associated with one or more environments and a user;

analyzing the irritant data to identify one or more potential irritants in the one or more environments;

predicting a user impact of the one or more potential irritants in the one or more environments based on one or more irritants of the user;

determining that the one or more irritants associated with the user are located in at least one environment of the one or more environments;

generating the irritant alert to the user, wherein the irritant alert indicates at least one irritant of the one or more irritants is associated with the at least one environment prior to the user entering the at least one environment; and displaying the irritant alert to the user, wherein the irritant alert is displayed to the user when the user enters an area having pharmaceuticals associated with allergy relief.

8. The system of claim 7, further comprising:

generating trend information associated with one or more over counter (OTC) irritant medications; and identifying, from the trend information, the at least one irritant of the one or more irritants associated with the one or more environments.

9. The system of claim 7, further comprising:

pushing the irritant alert to a personal smart device associated with the user, wherein pushing the irritant alert causes the personal smart device to have a tactile response.

10. The system of claim 7, further comprising:

propagating the irritant alert to a group of users associated with the one or more environments, wherein propagating includes one or more meshed devices on a wireless mesh network.

11. The system of claim 7, further comprising:

issuing the irritant alert to a primary user, wherein irritant alert is associated with an immediate user, wherein the primary user is not the immediate user.

12. The system of claim 7, wherein the irritant alert includes one or more irritant suggestions.

13. A computer program product for generating an irritant alert, the computer program product comprising a computer readable storage medium having program instructions embodied therewith, the program instructions executable by a processor to cause the processor to perform a function, the function comprising:

receiving irritant data associated with one or more environments and a user;

analyzing the irritant data to identify one or more potential irritants in the one or more environments;

predicting a user impact of the one or more potential irritants in the one or more environments based on one or more irritants of the user;

determining that the one or more irritants associated with the user are located in at least one environment of the one or more environments;

generating the irritant alert to the user, wherein the irritant alert indicates at least one irritant of the one or more irritants is associated with the at least one environment prior to the user entering the at least one environment; and displaying the irritant alert to the user, wherein the irritant alert is displayed to the user when the user enters an area having pharmaceuticals associated with allergy relief.

14. The computer program product of claim 13, further comprising:

generating trend information associated with one or more over counter (OTC) irritant medications; and identifying, from the trend information, the at least one irritant of the one or more irritants associated with the one or more environments.

15. The computer program product of claim 13, further comprising:

pushing the irritant alert to a personal smart device associated with the user, wherein pushing the irritant alert causes the personal smart device to have a tactile response.

16. The computer program product of claim 13, further comprising:

propagating the irritant alert to a group of users associated with the one or more environments, wherein propagating includes one or more meshed devices on a wireless mesh network.

17. The computer program product of claim 13, further comprising:

issuing the irritant alert to a primary user, wherein irritant alert is associated with an immediate user, wherein the primary user is not the immediate user.

* * * * *